(12) United States Patent
Grieve et al.

(10) Patent No.: US 8,695,006 B2
(45) Date of Patent: Apr. 8, 2014

(54) RESOURCE MANAGEMENT METHOD

(75) Inventors: Richard Grieve, Bristol (GB); Paolo Fragapane, Bristol (GB)

(73) Assignee: Oracle International Corporation, Redwood Shores, CA (US)

( * ) Notice: Subject to any disclaimer, the term of this patent is extended or adjusted under 35 U.S.C. 154(b) by 1435 days.

(21) Appl. No.: 12/114,518

(22) Filed: May 2, 2008

(65) Prior Publication Data

US 2009/0276784 A1 Nov. 5, 2009

(51) Int. Cl.
*G06F 9/46* (2006.01)
*G06F 9/44* (2006.01)

(52) U.S. Cl.
USPC .......................... 718/104; 718/100; 717/106

(58) Field of Classification Search
USPC ........... 718/100, 101, 102, 103, 104; 717/106
See application file for complete search history.

(56) References Cited

U.S. PATENT DOCUMENTS

| | | | |
|---|---|---|---|
| 7,152,090 B2 * | 12/2006 | Amirisetty et al. | 709/200 |
| 7,210,121 B2 * | 4/2007 | Xia et al. | 717/106 |
| 8,015,546 B2 * | 9/2011 | Jones et al. | 717/109 |
| 8,056,000 B2 * | 11/2011 | Vidyarthi et al. | 715/239 |
| 2002/0178239 A1 | 11/2002 | Kinyon et al. | |
| 2004/0158813 A1 * | 8/2004 | Xia et al. | 717/116 |
| 2007/0156715 A1 | 7/2007 | Mueller et al. | |
| 2007/0204261 A1 * | 8/2007 | Fetzer et al. | 717/163 |
| 2009/0037875 A1 * | 2/2009 | Jones et al. | 717/109 |
| 2010/0131926 A1 * | 5/2010 | Younce et al. | 717/122 |
| 2010/0192124 A1 * | 7/2010 | Hall et al. | 717/106 |

FOREIGN PATENT DOCUMENTS

| | | |
|---|---|---|
| GB | 2459572 A | 4/2009 |
| WO | WO 2009/081527 A1 | 7/2009 |

OTHER PUBLICATIONS

Nakano et al. "Method of creating web services from web applications", Sep. 2007, IEEE Internation Conference of Service-Oriented Computing and Application, pp. 1-7.*
"Java Service Wrapper: Configuration Property Overview" 5 pages; at http://wrapper.tanukisoftware.org/doc/english/properties.html; printed on Jul. 24, 2009.
"Foundation Services: Installing and Running Foundation Service as a Windows Service" 4 pages; at http://support.sas.com/rnd/itech/doc9/admin_oma/platserv/ps_windows_serv.html; printed on Jul. 24, 2009.
Search Report for Application GB0907501.1; issued on Aug. 5, 2009; 5 pages.

* cited by examiner

*Primary Examiner* — Emerson Puente
*Assistant Examiner* — Willy W Huaracha
(74) *Attorney, Agent, or Firm* — Kilpatrick Townsend & Stockton LLP (57) ABSTRACT

There is provided a method of managing a resource within a computer system using a configuration wrapper, the method comprising: providing a configuration file comprising configuration data for the resource; generating metadata related to the configuration data; and automatically processing the metadata to produce a configuration wrapper for the resource. The configuration wrapper may be a java object with management attributes and methods.

21 Claims, 10 Drawing Sheets

RESOURCE MANAGEMENT METHOD

BACKGROUND OF THE INVENTION

1. Field of the Invention

The present invention is in the field of resource management for resources within a computer system. In particular, the present invention provides a method of generating an object-oriented resource wrapper for use in managing a resource.

2. Description of the Related Art

To complete a given task on a modern computer system, the computer system will typically employ a myriad of hardware and software resources. These resources may comprise local software applications, hardware devices, data, or implementations of a remote software service. As the complexity of these systems has grown, so has the need to efficiently manage and configure the resources available.

Figure 1A:
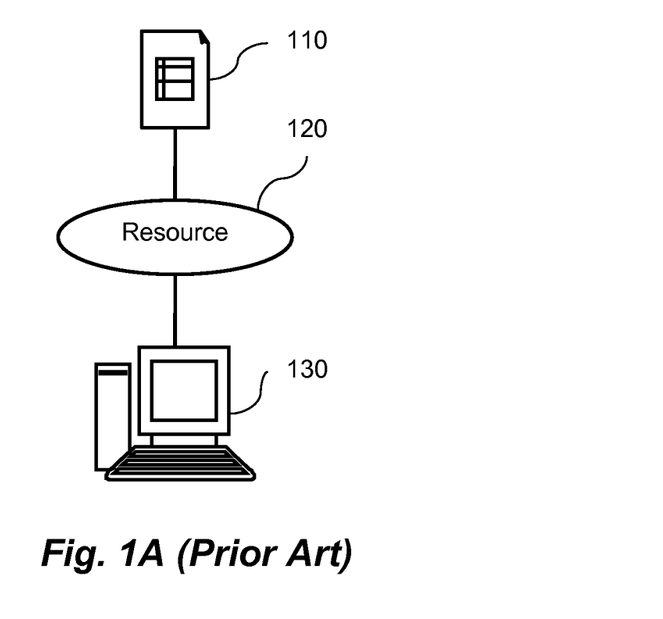
FIGS. 1A, 1B and 1C schematically show the management of a resource as performed in the prior art.

Many resources within modern computer systems can be configured using so-called configuration files. FIG. 1A illustrates the management of a resource according to these prior art methods. Resource 120 is typically associated with computer system 130 and an accompanying configuration file 110. Configuration file 110 comprises one or more configurable parameters relating to resource 120. When the computer system interacts with or runs resource 120, it makes use of configuration file 110 to appropriately set the configurable aspects of the resource 120. For example, if resource 120 comprises a software application, then configuration file 110 may comprise a parameter setting the default path for file access. In real-world implementations, a modern software application may have over ten different configuration files that expose over five hundred different attributes. Each of these attributes may be modified by a user to affect the behaviour of the software application. Using configuration files to manage the resources of a computer system provides a workable solution to the problem of resource complexity. However, in itself, this solution also introduces a number of further problems of its own.

A first problem is that often the configuration file 110 contains attribute fields that can only be understood by the developer of the resource. For example, a configuration file for a peripheral hardware device will be typically produced, and only understood, by the engineer, or team of engineers, responsible for the creation of the device and a configuration file for a software application will be typically produced, and only understood, by the programmer, or team of programmers, responsible for coding the application. In the latter case, the form and syntax of the configuration file may be intricately linked with the form and syntax of the software application. A user unfamiliar with the form and syntax of the software application will thus not be able to alter the configuration of the resource 120 by directly altering the configuration file 110, even if they are familiar with the language in which the configuration file is written. If a user unfamiliar with the intricate workings of the resource attempts to set configuration parameters and incorrectly edits the configuration file 110, then the accompanying resource 120 will not be configured correctly, increasing the likelihood of errors. Incorrect parameters set for a hardware device may cause the device to fail and incorrect parameters for a software application may cause the application to crash.

To increase the usability of configuration files, and to overcome the problem above, some technical developers began to provide user-friendly applications for configuring the parameters of the resource 120 in the configuration file 110. For example, a software application may provide a specially designed graphical interface for viewing and setting resource parameters. Such interfaces could also be adapted to provide advance features such as error checking and automatic updates; typically the user would alter the parameters in a graphical user interface and the configuration file would be updated behind the scenes when the user pressed a "SAVE" button.

Figure 1B:
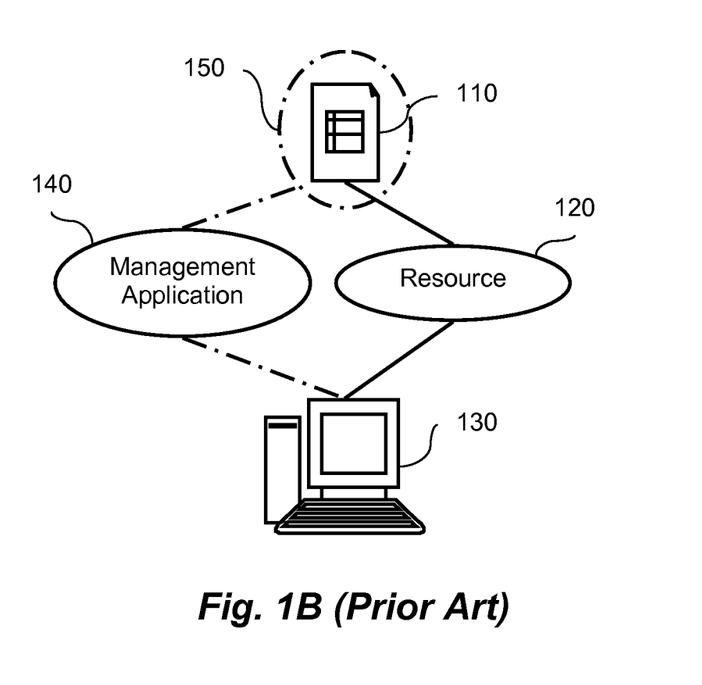
Figure 1C:
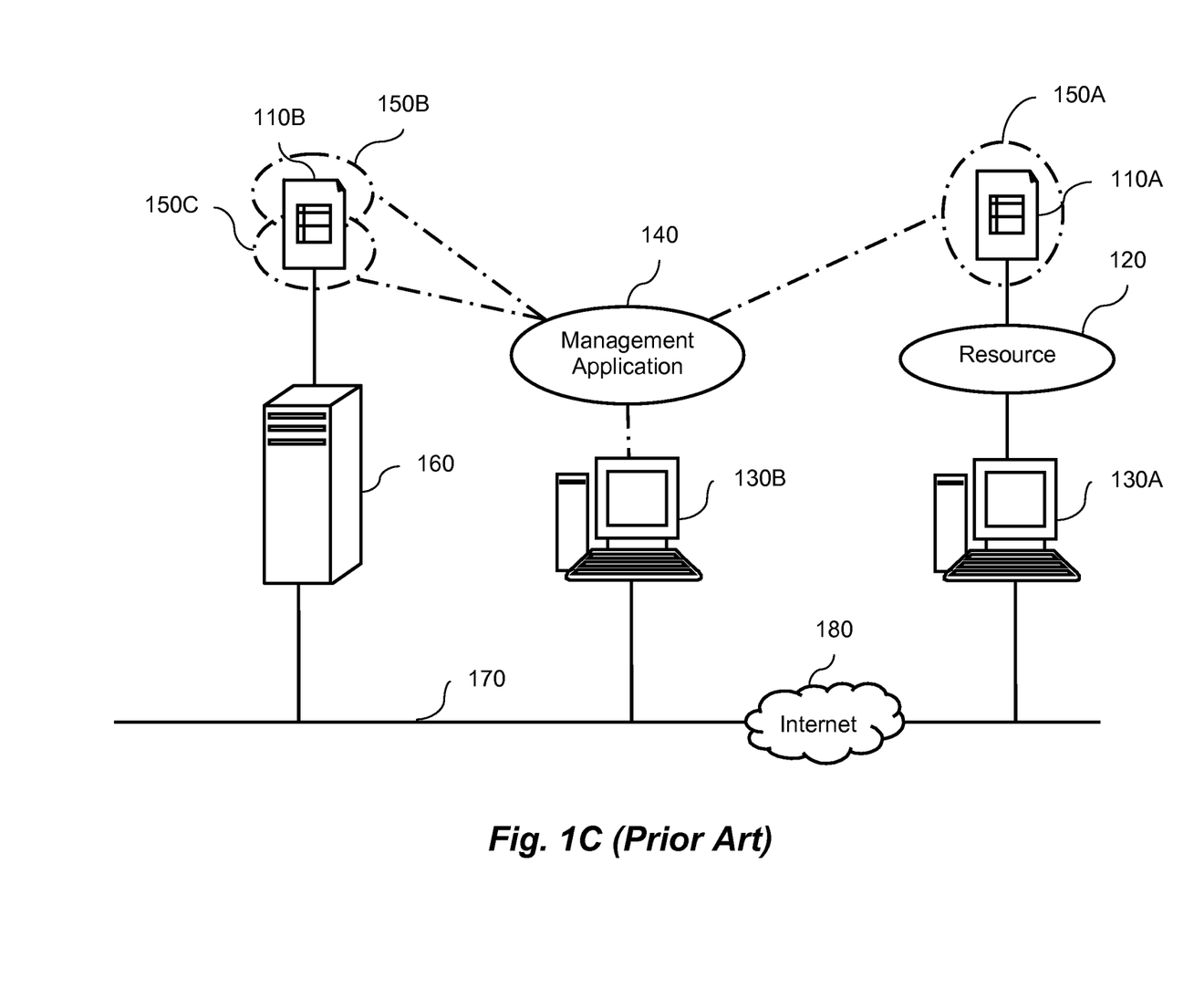

While the provision of configuration applications facilitated the updating of configuration files, it also generated another problem in that the user now had to be familiar with the specific configuration applications for a particular resource. Moreover, each configuration application typically provided a different user interface and a different method of updating configuration files. Therefore, to further facilitate the process of updating configuration files, a number of resource management standards were agreed upon. These standards were typically accompanied by a standard set of application programming interfaces (APIs) that enabled a number of heterogeneous resources to be managed in a common manner. Different standards were typically developed for different programming languages and the Java standard is referred to as Java Management eXtensions (JMX). FIGS. 1B and 1C show prior art methods of resource management using standardised interfaces.

FIG. 1B shows a computer system 130 with an associated resource 120 and a configuration file 110 as found in FIG. 1A. However, in FIG. 1B, a management application 140 is used to configure the resource 120. The management application 140 is typically built upon a set of standards such as the JMX standard for the Java language which provides a number of APIs designed specifically for resource management. All of today's large application vendors provide built-in JMX management applications inside their application servers. For example Oracle, JBoss, Sun and other companies provide stand-alone applications that are specifically designed to manage configuration files using JMX technology.

In order to allow the management application 140 to interact with a number of configuration files 110 of different types and form, a configuration wrapper 150 is provided. For example, in an object-oriented programming environment, the configuration wrapper 150 may comprise a software object that models the resource 120. The JMX standard requires that developers "wrap" their configuration files in Java software objects called MBeans (Management Beans). The process of "wrapping" a resource typically comprises modelling the resource using one or more software objects. This MBean may encapsulate other lower level software objects and provides standardised methods for accessing and writing configuration information to a configuration file 110. For example, the software objects may provide "GET" methods to retrieve configuration parameter values associated with the resource 120 and "SET" methods to save configuration parameter values associated with the resource 120. The configuration wrapper 150 thus provides an interface between the management application 140 and the actual configuration file 110. The JMX standard then allows developers to use management applications that can read data associated with MBeans and provide a management user interface to edit values associated with the resource 120.

FIG. 1C shows an extended schematic diagram of the use of configuration wrappers to manage several different resources. FIG. 1C shows a computer system 130A, a resource 120 and a first configuration file 110A as shown in FIGS. 1A and 1B. The first configuration file 110A has an associated configuration wrapper 150A. The system 130A is connected to a network 170. In this example, computer system 130A is connected to computer system 130B and hardware device 160 through the Internet 180. Computer system 130B runs management application 140 which is configured to manage resource 120 and hardware device 160. Management application 140 thus accesses and modifies configuration information for resource 120 via configuration wrapper 150A associated with configuration file 110A. In FIG. 1C, hardware device 160 also has an associated configuration file 110B. This configuration file may contain settings such as memory and cache settings, memory or IP addresses for the device, interrupt request (IRQ) priority and/or any other operating parameters of the hardware device 160. In the example shown in FIG. 1C, configuration file 110B has two associated software objects for reviewing and setting configuration data contained in the configuration file 110B. For example, the first configuration wrapper 150B may comprise a software object such as an MBean that is configured to access and modify the network properties of the hardware device 160. The second configuration wrapper 150C may then comprise another MBean software object that is alternatively configured to access and modify configuration data relating to memory use and access. Using configuration wrappers 150A, 150B and 150C, a user of computer system 130B can manage a plurality of resources using management application 140 and can manage resources that are located either remotely or locally.

However, the use of standards such as JMX comes at a price to developers. In order to "wrap" a resource using a software object, the variables and methods of the software object must be defined by the developer based on the properties of the resource and the resource's configuration file, i.e. an MBean must be manually generated by the developer of the resource 120 based on the form and syntax of the configuration file 110. For example, if configuration file 110 comprises a parameter such as "file path", then the configuration wrapper 150 would need to contain an internal property such as "file_path" and a method for accessing and setting this property, for example a "GET.file_path" method. The methods of the MBean are set out in program code within the class definitions for the MBean and are written by the developer of the resource 120 using their knowledge of the resource 120 and configuration file 110. While the development of software objects many be tractable when dealing with a small number of resources, generating software objects to manage a large number of resources and configuration files can take an exceedingly long amount of time, especially if each file has a large number of configuration attributes and there are a large number of resources or configuration files. For example, when using the JMX standard, a developer will need to generate the class files to implement the MBean and will need to set the attributes and methods of the MBean within these class files based on the format of the configuration file.

A further problem also arises when attempting to maintain software objects relating to the resource and the resource's configuration files. When a resource is altered or updated, for example patching a software application or implementing a firmware update for a piece of hardware, the associated software object will also need to be updated to reflect the changes made to the resource and any related configuration files. This can be cumbersome if a resource is continually being updated, for example when updating a given software application to fix bugs reported by users. If the software object, such as the MBean, is not up-to-date with the format of the configuration files, then inconsistencies will be introduced and the resource may be configured incorrectly. For example, if an MBean has not been updated by the developer based on a software update, the JMX management applications may throw an error when they interact with the MBean to try to retrieve configuration values that no longer exist in the configuration file.

Hence, it is an object of the present invention to provide a simple method for managing a resource. Such a method should preferably facilitate the writing and maintaining of software objects used to manage a resource within a particular software standard.

BRIEF SUMMARY OF THE INVENTION

According to a first aspect of the present invention, there is provided a method of managing a resource within a computer system using a configuration wrapper, the method comprising:
    a. providing a configuration file comprising configuration data for the resource;
    b. generating metadata related to the configuration data; and
    c. automatically processing the metadata to produce a configuration wrapper for the resource.

The method of the first aspect of the invention enables configuration wrappers to be generated quickly and easily without manual intervention; this not only decreases the time required to initially set up a resource management system but also facilitates the process of updating configuration wrappers after changes are made to the resource.

Preferably, the resource comprises one of: an application, an implementation of a software service, a device, a database or a user; however, this list is non-exhaustive and configuration wrappers generated by the present invention may be used to manage any resource known in the art.

In a preferred embodiment the configuration wrapper comprises a Java object with associated attributes and operations, for example an MBean object. However, configuration wrappers in other formats may also be generated using the methods of the present invention, for example C++ objects or XML Schema files. In certain embodiments the configuration wrapper may be implemented using a plurality of Java objects.

In certain embodiments the metadata is stored in a metadata file and step b) comprises generating a CSV or XML metadata file associated with the configuration data. This generation of the metadata file may be performed automatically using an appropriately configured algorithm or manually based on a original configuration file.

In certain embodiments step c) may comprise:
    providing a reference to the metadata file;
    processing the metadata file using an automator application;
    generating one or more files used to implement the configuration wrapper.

In this case the reference may be a mapping file, which may contain a reference to one or more metadata files and/or configuration files.

Typically, management of the resource comprises viewing properties of the resource by calling methods associated with the configuration wrapper, wherein the methods of the configuration wrapper may retrieve data from the configuration file or they may modify properties of the resource, for example by modifying data within the configuration file.

Additionally, in certain management routines, any time after step (c) the method may further comprise the steps of:
    d. loading a management agent for managing one or more resources;
    e. implementing the configuration wrapper;
    f. associating the configuration wrapper with the management agent; and g. using the management agent to view and/or modify the properties of the resource.

In particular embodiments the management agent may comprise a JMX management application, in other embodiments the agent may comprise a C++ or XSD-based application In a preferred method of updating information related to the resource the method further comprises:
    altering the form of the configuration file;
    updating the metadata associated with the configuration data; and
    automatically processing the metadata a further time to produce an updated configuration wrapper for the resource.

According to a second aspect of the present invention there is provided a data structure for use in managing a resource within a computer system, the data structure comprising:
    a configuration file comprising configuration data for the resource;
    a metadata file comprising metadata associated with the configuration data; and
    a configuration wrapper for use in managing the resource,
    wherein the configuration wrapper was generated automatically based on the metadata file.

According to a third aspect of the present invention there is provided a management system for managing a resource within a computer system, the management system comprising:
    means for storing configuration data for the resource;
    means for storing metadata associated with the configuration data; and
    means for managing the resource,
    wherein the means for managing the resource was generated automatically based on the means for storing meta data.

In a preferred embodiment, the means for managing the resource is adapted to read and/or modify configuration data for the resource associated with the means for storing configuration data.

According to a fourth aspect of the present invention there is provided a system for generating a configuration wrapper for use in managing a resource, the resource having a configuration file, the system comprising:
an input module adapted to receive a reference to a metadata file related to the configuration file;
    a mapping module adapted to store the reference in memory;
    a metadata module adapted to generate one or more metadata objects in memory based on data within the metadata file;
    a builder module adapted to generate one or more configuration wrapper objects in memory based on the metadata objects; and
    a writer module adapted to write one or more implementation files based on the one or more configuration wrapper objects generated by the builder module,
    wherein the one or more implementation files are used to implement a configuration wrapper for the resource.

In a preferred embodiment, the builder module and the writer module are adapted to produce configuration wrapper objects and implementation files in one or more of the following formats: Java, C++ and XML Schema (XSD). In particular cases the system may also further comprise one or more additional builder and writer modules, wherein the system is adapted to output implementation files for two or more formats, e.g. Java and C++ or C++ and XSD.

Preferably, the input module is adapted to receive a mapping file comprising one or more mappings between one or more configuration files and one or more respective metadata files; wherein, in certain cases, the input module is also adapted to receive a mapping file comprising a plurality of mappings and the system is then further adapted to generate implementation files for a plurality of configuration wrappers, which may or may not be used for managing a plurality of resources.

According to a fifth aspect of the present invention there is provided a computer-readable medium comprising program code configured to process metadata associated with configuration data for a resource within a computer system to generate a configuration wrapper for use in managing the resource.

Hence, a method of managing a resource is provided in which a software object, or "wrapper", used to manage the resource is generated automatically based on metadata related to a configuration file.

BRIEF DESCRIPTION OF THE DRAWINGS

Embodiments of the present invention will now be described and contrasted with known examples with reference to the accompanying drawings, in which.

DETAILED DESCRIPTION OF THE INVENTION

Figure 2A:
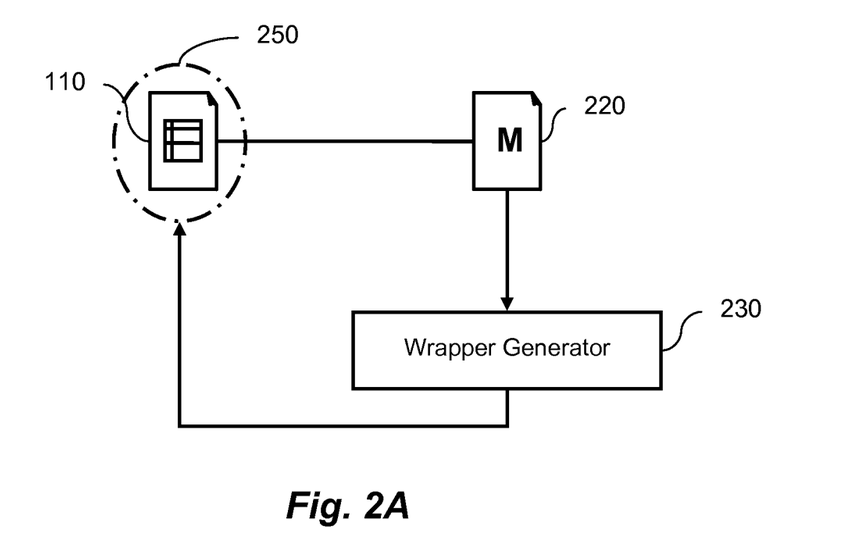
FIGS. 2A and 2B schematically show an exemplary system for generating a configuration wrapper according to a first embodiment of the present invention.

FIG. 2A schematically shows an exemplary system for generating a resource wrapper according to a first embodiment of the present invention. In this embodiment, a configuration wrapper 250 is generated automatically by a wrapper generator 230. The configuration wrapper 250 may be used in arrangements such as those shown in FIGS. 1B and 1C, i.e. may be used to access and edit information stored in a configuration file 110 and to provide configuration file information in a suitable form to a management application 140. The wrapper generator 230 may comprise either an algorithm embodied in program code that is adapted to be run on a processor or suitably configured hardware adapted to output data in the form of a configuration wrapper 250. The wrapper generator 230 generates the configuration wrapper 250 using metadata 220 that is generated from a related configuration file 110. The configuration file 110 may be related to a resource, such as resource 120 shown in FIGS. 1A to 1C. The related resource may be any one of a software application operating on a processor of computer system 130, a hardware device connected to a bus or I/O (input/output) channel of computer system 130, a database, or data relating to a user of computer system 130.

In a preferred embodiment of the present invention the configuration file 110 has a file extension of ".ini" and ".xml", representing respectively a system configuration file and an XML file; although, the systems and methods herein may also be adapted to process other file types if required. A simple example of an ".ini" file is shown below, wherein attribute fields are defined using the syntax "NAME=PROPERTY":

```
[server]
Server-name=server1.us.oracle.com
Server-port=1082
[database]
Db-user=joeblogs
Db-password=user1
```

Example 1

XML (".xml") files define an attribute field using one or more XML tags, as can be seen in the simple example file shown below:

```
<Server>
    <ServerName> server1.us.oracle.com </ServerName>
    <ServerPort>1082</ServerPort>
</Server>
<Database>
    <DbUser>joeblogs</DbUser>
    <DbPassword>user1</DbPassword>
</Data base>
```

Example 2

Figure 3:
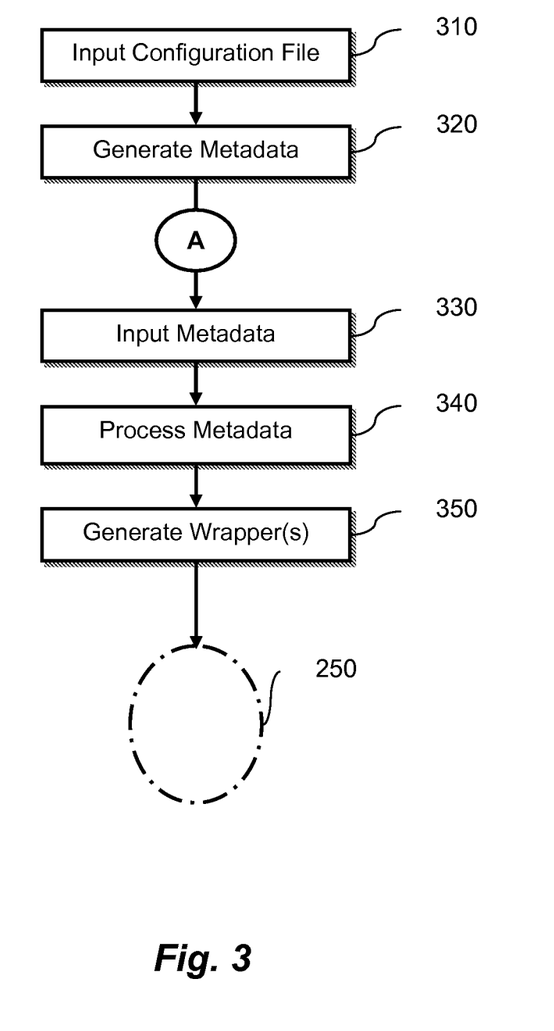
FIG. 3 illustrates in more detail an exemplary method of generating a configuration wrapper for a resource according to the first embodiment.

The wrapper generator 230 may also be adapted to process other types of configuration file including configuration information stored in one or more database tables. An exemplary method of generating the configuration wrapper 250 is shown in FIG. 3. The method begins at step 310 in FIG. 3, wherein a configuration file 110 is input into a wrapper generation routine. At step 320, the configuration file is parsed and processed in order to generate metadata 220 based on the file. Such metadata is typically saved as a separate metadata file 220. Alternatively, a metadata file 220 may be generated manually by a software engineer based on the configuration file 110. The metadata file 220 lists all of the attributes that can appear in the configuration file 110 along with any extra required metadata such as data type, description, default value etc. Steps 310 and 320 thus form the generation of the metadata file 220 and may be performed at any time before the generation of a configuration wrapper 250.

When a configuration wrapper 250 is required, the metadata file 220 is input into a wrapper generator 230 at step 330. The wrapper generator 230 reads the metadata and creates all of the necessary software objects that are required to manage the configuration file. The metadata file 220 is processed by the wrapper generator 230 at step 240 and, based on the metadata values, a wrapper is generated at 350. This wrapper 250 can then be used to manage the configuration file 110 using a management application 140. For example, the configuration wrapper 250 may comprise an MBean that can be used to manage the configuration file 110 using JMX technology.

Figure 2B:
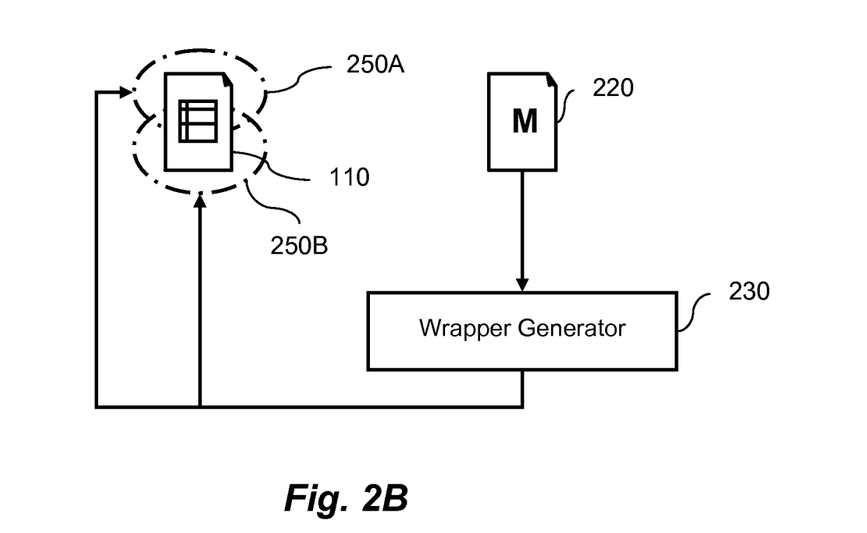

The wrapper generator 230 may also generate more than one configuration wrapper if needed. Such a process is shown in FIG. 2B. Here the wrapper generator 230 generates a first configuration wrapper 250A and a second configuration wrapper 250B based on metadata file 220. For example, if the configuration wrapper comprises a software object such as an MBean, then the wrapper generator 230 may produce two software objects or two MBeans in order to manage the resource via configuration file 110.

Once the metadata file 220 has been generated, the file may be used as input into a plurality of different wrapper generators 230, wherein each wrapper generator 230 is configured to produce a configuration wrapper 250 of a specific form and/or software technology. For example, a first wrapper generator 230 may be configured to generate one or more MBeans for the JMX standard. A second wrapper generator 230 may be adapted to produce a C++ software object for use in a separate management standard.

Figure 4:
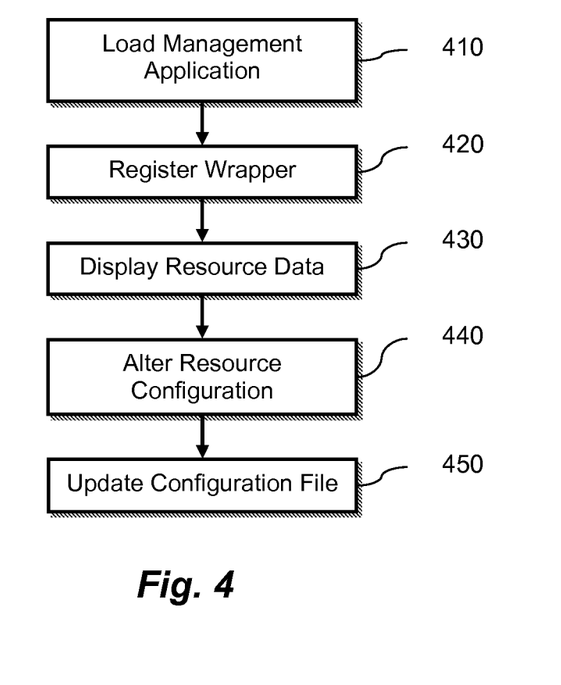
FIG. 4 illustrates an exemplary method of managing a resource using configuration wrappers generated using the present invention.

An exemplary method of managing data using the automatically generated configuration wrapper 250 is shown in FIG. 4. At step 410, a computer system such as system 130B will load a management application 140. At step 410, the automatically generated configuration wrapper 250 is registered with the management application 140. For example, if the management application comprises an application based on the JMX standard, then standard methods exist to register a generated MBean with an MBean server. After the configuration wrapper 250 has been registered with the management application 140, then the management application 140 is able to display data associated with the resource at step 430. This data is accessed using the configuration wrapper 250 as an interface between the management application 140 and the configuration file 110. Whilst managing the resource 120, a user may wish to alter the resource configuration as shown by step 440. This may be achieved by requesting that the management application 140 display a particular parameter using a standard graphical user interface, wherein the user is able to manually edit the parameter. Predefined methods set by the standard that is used to generate the management application 140 can then be used to parse, verify and/or validate the entered configuration and check for errors. If the configuration is seen to be acceptable, then the configuration file 110 can be updated at step 450 using the configuration wrapper 250. This is performed by calling predefined APIs forming part of the MBean and MBean code that forms part of the MBean definition. The MBean code produced by the wrapper generator 230 as part of the wrapper generation process is used to implement the API methods and read/write data forming part of the configuration file 110 in a suitable manner. For example, the MBean code may call upon specific libraries of functions to read/write to ".XML" and ".ini" files. The exemplary method of FIG. 4 may be used with configuration wrappers generated using the system and methods of any embodiment of the present invention.

The present invention also allows MBeans to be maintained in the light of changes to a resource. For example, if a resource 120 comprises a software application, then the present invention can be used to update the configuration wrapper 250 after an update has been applied to correct a bug in said software application. The method of FIG. 5 begins at step 510 wherein a developer will update the resource, for example to correct a bug in a software application. At step 510 they will also update the configuration file to reflect the new form of the resource. For example, the update may mean that a parameter previously referred to as "temp_dir" is now known as "cache_location". At step 530, the metadata is updated in correspondence with the update to the configuration file. Once the metadata file 220 has been updated at step 530, then steps 330 to 350 of FIG. 3 are performed. These steps implement the wrapper generator 230, and generate a new version of the configuration wrapper 250. This alleviates the need for a software engineer to manually regenerate or update the MBean. Again this also applies when using a configuration wrapper generated according to any embodiment of the present invention.

The present invention allows configuration wrappers such as MBeans to be generated in seconds rather than days or weeks. Hence the present invention saves time in creating and maintaining configuration wrappers. The present invention also reduces the risk of error when generating configuration wrappers as the automated methods will always produce a functioning MBean which reduces the chance of human error.

Figure 6:
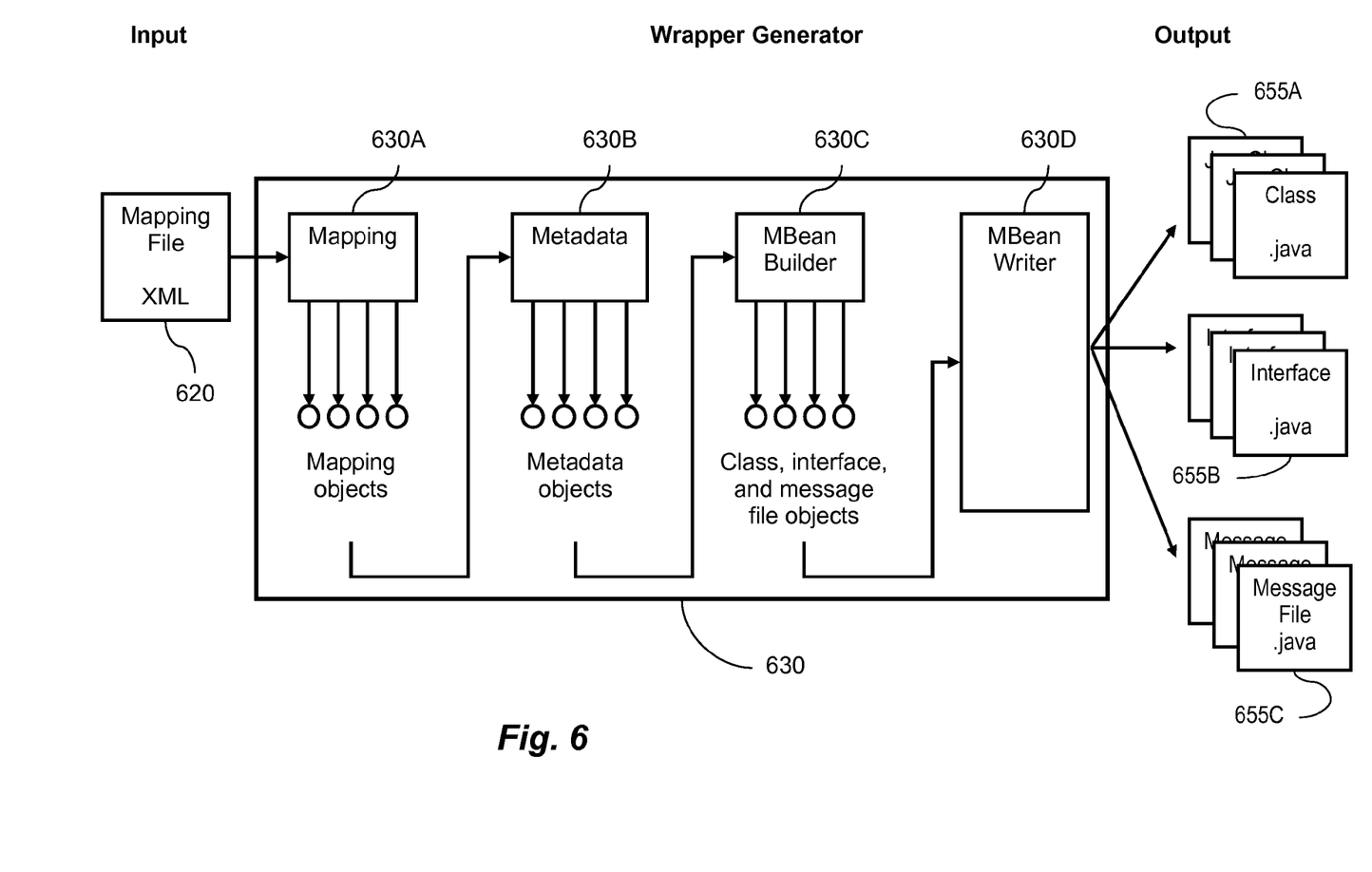
FIG. 6 schematically shows an exemplary system for generating a configuration wrapper according to a second embodiment of the present invention.

A second embodiment of the present invention will now be described with reference to FIGS. 6 to 10. FIG. 6 shows an exemplary system comprising an extended version of the first embodiment shown in FIG. 2A. The wrapper generator 630 of FIG. 6 comprises four separate components, 630A to 630D, wherein each component is adapted to implement a different stage of wrapper generation. In the example shown in FIG. 6, wrapper generator 630 comprises Mapping Component 630A, Metadata Component 630B, MBean Builder Component 630C and MBean Writer Component 630D.

Wrapper generator 630 is adapted to receive a mapping file 620. The mapping file 620 is provided as an optional enhancement to the method of the first embodiment, wherein the mapping file defines the relationship between a particular configuration file, such as 110, and a particular metadata file, such as 220. Typically, the mapping file will be provided in XML format and a simplified example of a segment of a mapping file is provided below:

```
<component name="server">
    <config file="config/server-config.xml"
        metadata file="metadata/server-metadata.csv"/>
    <config file="config/admin-config.xml"
        metadata file="metadata/admin-metadata.csv"/>
</component>
<component name="database">
    <config file="config/database-config.ini"
        metadata file="metadata/database-metadata.csv"/>
</component>
```

Example 3

The mapping file 620 simplifies the wrapper generation process when multiple metadata files are used to manage a resource or set of resources as only one file need be fed into the wrapper generator 630, i.e. instead of having to input each metadata file individually. The use of a mapping file 620 also allows wrapper generation for a number for a number of related resources to become an automated batch process and enables a developer to control which configuration files will have configuration wrappers created for them. For example, if there are ten configuration files but configuration wrappers are only required for five of these files then only the selected five configuration files are listed in the mapping file along with their respective metadata files. The use of a mapping file also enables the same wrapper generator 630 to be used for different projects, wherein each project uses a different mapping file as an input. Hence, the configuration wrappers to be generated in a particular run can be easily specified.

In the present example, the metadata file comprises a comma-separated values (CSV) file as this file is easily editable in standard spreadsheet applications (such as Microsoft Excel). The CSV format is preferred as it makes the metadata files easy to edit and enables a team of developers to easily review and update metadata files. However, depending on circumstances and personal preference the metadata file may any other file known in the art (e.g. an XML or custom file).

If the configuration file contains values for all available attributes (even if these values are null or default) then the metadata file can typically be generated automatically using algorithms adapted to parse and extract data from configuration files. However, in certain cases the resource or application using a configuration file may be adapted to use a default attribute value when an expected configuration attribute is not detected. As this information is typically external to the configuration file, it may not be possible to distinguish between the case wherein an attribute exists but has no value and the case wherein no attribute exists. Hence, in these circumstances the metadata file may need to be generated manually.

Figure 7:
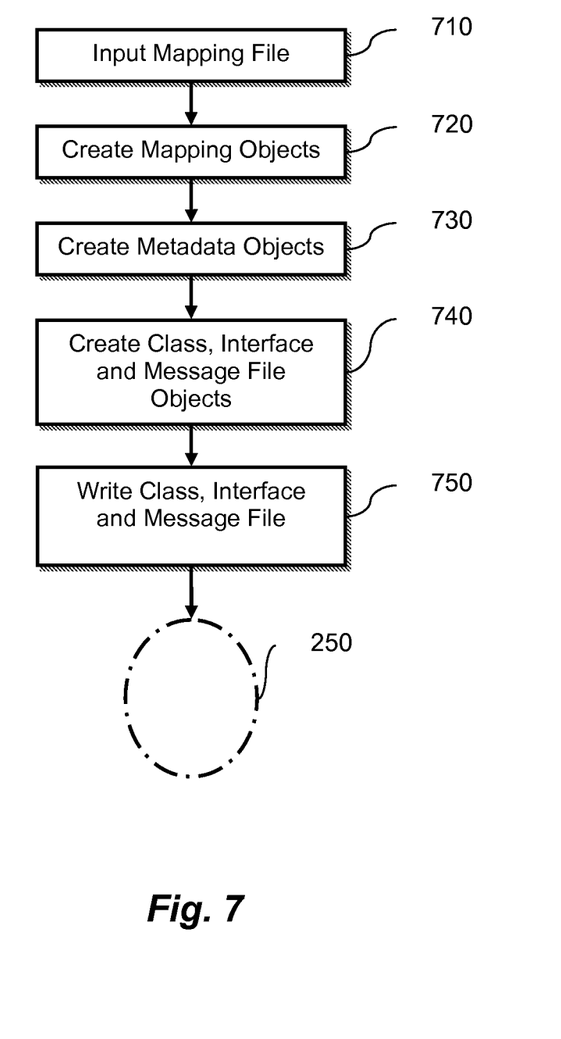
FIG. 7 illustrates an exemplary method of generating a configuration wrapper according to the second embodiment of the present invention.

Turning to FIG. 7, an exemplary method of generating a configuration wrapper, for example an MBean java object, using the components shown in FIG. 6 will now be described. At step 710 a mapping file 620 is inputted into the wrapper generator 630. At this stage the wrapper generator 630 reads the mapping file using Mapping Component 630A and at step 720 the Mapping Component 630A generates one or more mapping objects in memory for each mapping between a configuration file and a metadata file found in the mapping file 620. Mapping component 630A may be a set of logic or a series of lines of program code configured to perform a mapping object generation method similar to that shown in FIG. 8.

Figure 8:
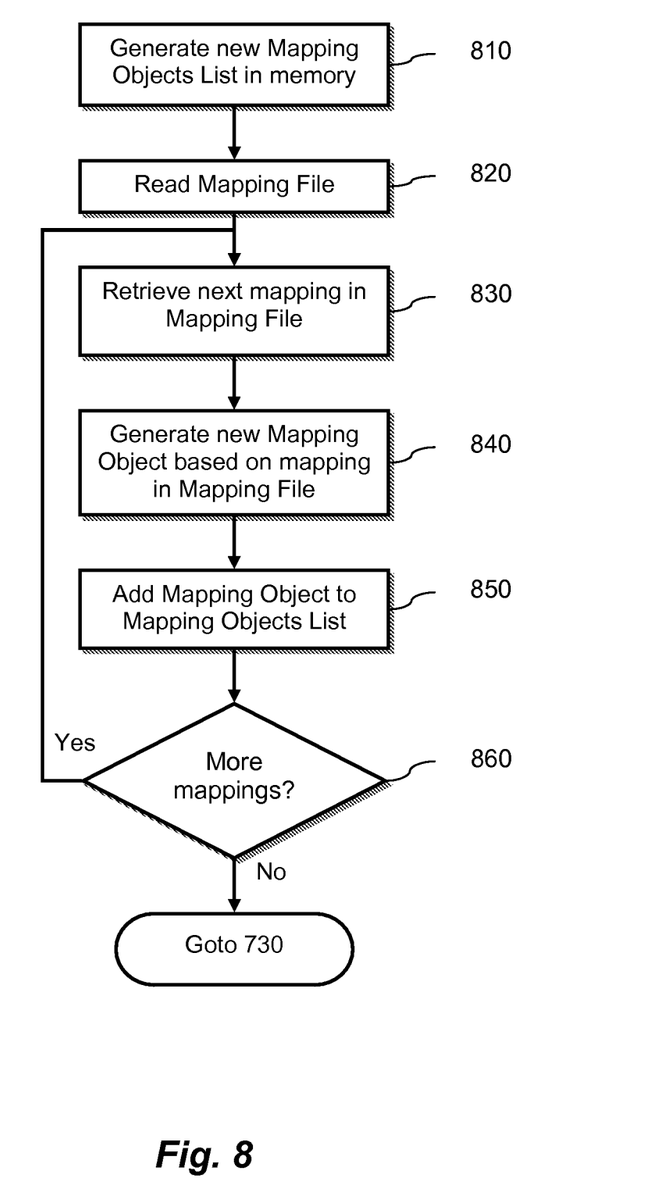
FIG. 8 illustrates an exemplary method of creating mapping objects according to the second embodiment of the present invention.

The exemplary mapping object generation method of FIG. 8 begins at step 810 wherein a new mapping object list is generated in memory. At step 820 the input mapping file 620 is read by Mapping Component 630A and at step 830 the first mapping in the mapping file is retrieved. At step 840 a new mapping object is generated based on the retrieved mapping and at step 850 the mapping object is added to the mapping object list generated in step 810. At step 860 a check is made to determine whether there are any more unprocessed mappings within mapping file 620. If there are then the method loops around to step 830, the next mapping in the mapping file is retrieved and steps 840 to 860 are repeated. If there are no more mappings then the method proceeds to step 730 in FIG. 7.

Mapping objects are generated in memory by mapping component 630A in order that the other components 630B to 630D need not repeatedly access the mapping file 620. This is because file access is slow compared to memory access and thus constant access of the mapping file would detrimentally affect the time required for wrapper generation. This becomes more important when a large number of configuration wrappers are required, for example, as part of an automated batch generation process.

At step 730 a set of metadata objects are generated based on the mapping objects by Metadata Component 630B. Metadata Component 630B performs the method steps shown in FIG. 9. The Metadata Component 630B is generally adapted to cycle through each mapping object and to generate a generic metadata object in memory.

Figure 9:
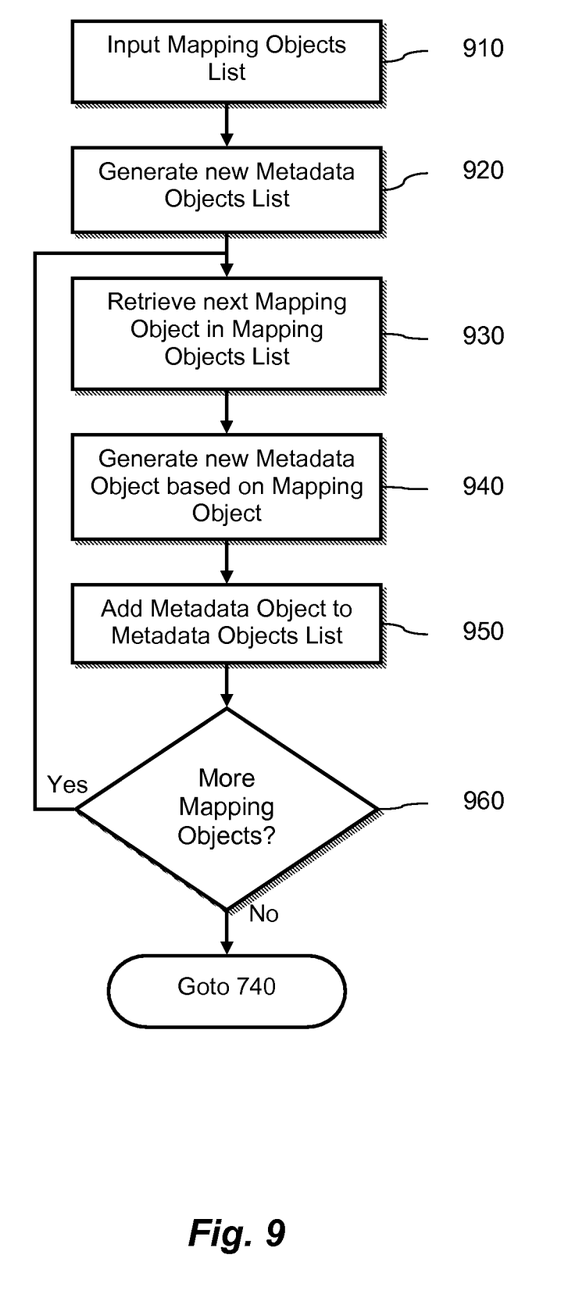
FIG. 9 illustrates an exemplary method of creating metadata objects according to the second embodiment of the present invention; and, FIG. 10 illustrates an exemplary method of creating java objects according to the second embodiment of the present invention.

At step 910 the mapping objects list previously generated by Mapping Component 630A is input into the Metadata Component 630B. At step 920 a new metadata objects list is generated. This list will be empty at this point in the method. At step 930 the first mapping object in the mapping object list is retrieved and then at step 940 a new metadata object is generated based on the mapping object. In particular, the Metadata Component 630B will use the mapping object to retrieve the location of the metadata file associated with the current mapping and then the data within the metadata file would be read into the wrapper generator 630 in order to generate the metadata object. Typically, a metadata object comprises a name and a list of attributes, wherein this data is based on that contained in a metadata file.

In certain embodiments each configuration file may have many metadata objects and/or files. As configuration files are typically grouped into different sections, a metadata object may be generated based on each section; for example a configuration file may have a group of database properties, a group of server properties and a group of user properties, wherein a group of metadata objects may be generated for the database properties, a single metadata object may be generated for the server properties and a single metadata object may be generated for the user properties. The mapping between the sections of the configuration file and the metadata objects that are generated will typically be determined by data within the metadata file. For simplicity, the groups are normally based on the groups within the configuration file but this need not be the case in all situations.

After the metadata object has been generated at step 940 this object is added to the metadata object lists at step 950 and then at step 960 a check is made to see whether there are any more unprocessed mapping objects in the mapping objects list. If there are more mapping objects then steps 930 to 950 are repeated with the next mapping object in the mapping object list; if there are no more mapping objects in the mapping object list then the method proceeds to step 740 in FIG. 7.

At step 740 one or more java objects are generated based on the list of metadata objects generated in the previous step. In the example shown in FIG. 6, this is performed by the MBean Builder Component 630C, which implements the method of FIG. 10.

Figure 10:
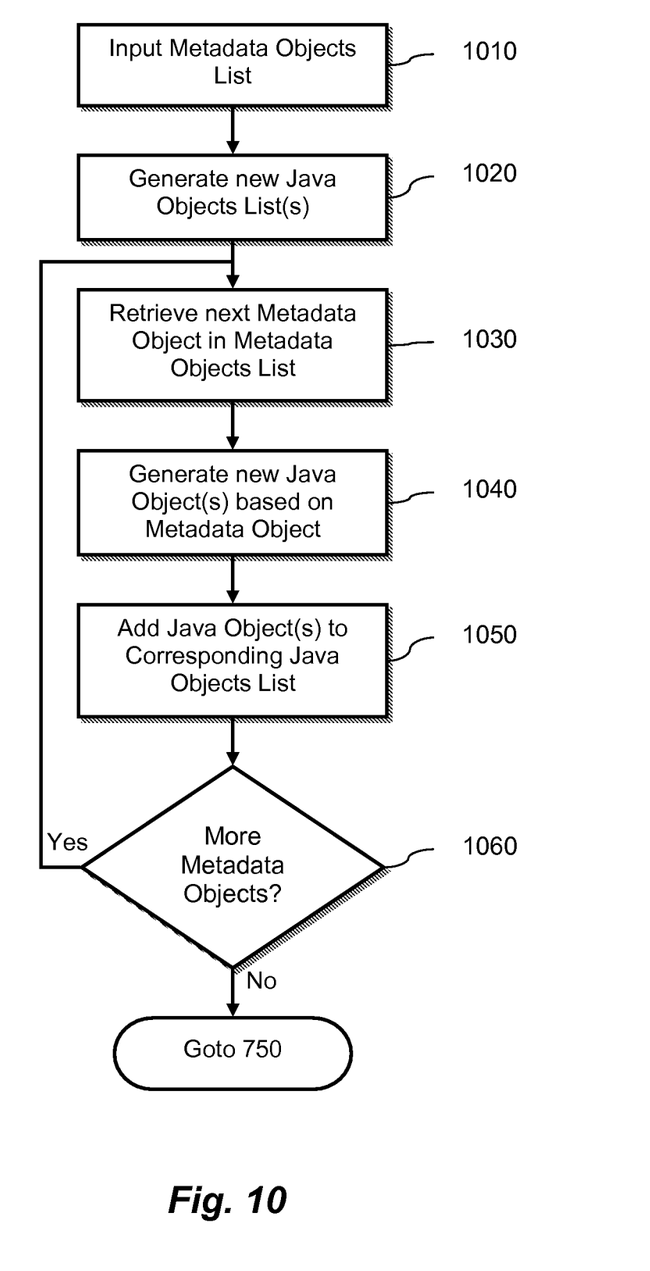

At step 1010 the metadata objects list previously generated in step 730 is input into the MBean Builder Component 630C. At step 1020 one or more java object lists are generated based upon the different object groups required. In the present example, three lists are generated: one for class objects, one for interface objects and one for message file objects. At step 1030 the first metadata object in the metadata object list is retrieved and then at step 1040 one or more java objects are generated based on the metadata object. For example, in the present case a class object, an interface object and a message file object will be generated in memory based on the metadata object.

In certain embodiments, this step may be performed using code templates that may be stored as part of the java package implementing the MBean Builder Component 630C. This is possible as a lot of the program code that allows the generation of an MBean object is repeatable. As each metadata object is processed by the MBean Builder Component 630C the various properties and/or metadata information associated with the object is extracted and inserted into appropriate sections within one or more of these code templates. For example, if the metadata object were to have two properties such as "NAME" and "AGE" then the MBean Builder Component 630C may take a "GET" method template and generate two appropriate "get" methods based on these properties, such as "getNAME( )" and "getAGE( )". The different types of java objects created at this stage represent the different components that are required to implement a java object.

After step 1040 the one or more java objects are added to a corresponding java object list at step 1050; i.e. in this example the class object is added to the class object list, the interface object is added to the interface object list and the message file object is added to the message file list.

When using different programming languages or different configuration wrapper standards the MBean Builder Component can be adapted and/or extended to produce different types of output. For example, if, instead of a java object, a C++ object was used, then at this stage the metadata object would be converted into one or more C++ objects, e.g. C++ class objects and C++ header objects, by a C++ Builder Component. Alternatively, if a developer needed to generate an XML Schema definition (XSD) configuration wrapper based on XML files then a XSD Builder Component may be provided that is adapted to convert metadata files into XSD objects. It is also possible to have one or more Builder Components operating in parallel, e.g. it is possible to generate both java and C++ objects from the same metadata information.

Returning to FIG. 10, at step 1060 a check is made to determine whether there are more unprocessed metadata objects within the metadata objects list. If there are then steps 1030 to 1060 are repeated until all metadata objects in the metadata object list have been processed. If no more unprocessed metadata objects exist in the metadata objects list then the method proceeds to step 750. At step 750 an MBean Writing Component 630D is used to write java objects as files within a file system. The process of generating configuration wrapper objects in memory and writing the files required to implement said objects is separated in the present embodiment as it allows all objects in memory to be written to the respective files in one go, which speeds up the process. In the present example, as MBean configuration wrappers are required, three different file outputs are provided: one or more java class files 655A; one or more java interface files 655B; and one or more java message files 655C; wherein all these file have a "java" extension and are used to implement a configuration wrapper such as 250.

The one or more java message files 655C contain all the message strings associated with the java wrapper object. The message strings are optional and typically provide descriptions of functions and/or interfaces associated with an configuration wrapper, such as an MBean wrapper. The java message files typically comprise one or more message strings that are indexed using an associated message identifier. The message identifier may then be cited within the one or more java interface and/or class files together with data identifying the parent message file containing the associated message string. When interpreting and/or implementing the files that comprise the configuration wrapper the message identifier and message file data may then be used to retrieve and return the associated description text. The use of message strings simplifies translation of description text from a native language into a foreign language, for example from English to Russian, wherein the message strings need only be translated just before production.

In the present example, the MBean Writing Component 630D is designed to generate the files required to implement a java object; however, this Component may be replaced and/or extended with other Components adapted to write files of different output types, for example C++ files or XSD files, in a similar manner to that discussed with relation to the MBean Builder Component 630C.

Figure 5:
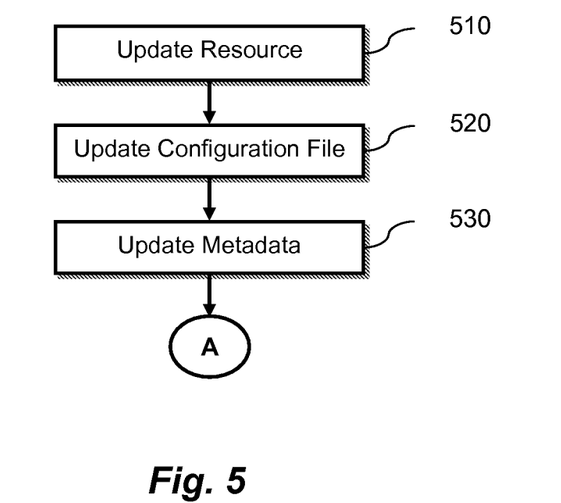
FIG. 5 illustrates an exemplary method of updating a resource and the accompanying configuration files in accordance with the present invention.

The output of the wrapper generator 630 may now be used to implement one or more configuration wrappers for one or more resources, allowing the one or more resources to be managed and/or updated as described with reference to FIGS. 4 and 5.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable-type media such as floppy disks, a hard disk drive, RAM and CD-ROMs as well as transmission-type media such as digital and analogue communications links.

What is claimed is:

1. A method of managing a computer resource using a configuration wrapper, the method comprising:
   receiving a computer-readable configuration file that configures a resource based on at least one configurable parameter, the computer-readable configuration file comprising configuration data for the resource at a computer system, the configuration data including one or more configurable parameters related to the resource;
   generating, with the computer system, computer-readable metadata related to the configuration data and storing in a computer-readable metadata file;
   generating, with the computer system, a configuration wrapper by automatically processing the computer-readable metadata to manage the computer-readable configuration file,
   wherein automatically processing the metadata comprises:
      providing, with the computer system, a reference to the metadata file,
      processing, with the computer system, the metadata file using an automator application, and
         generating, with the computer system, one or more files that are used to implement the configuration wrapper; and
      storing the configuration wrapper in a computer-readable medium.

2. The method of claim 1, wherein the computer resource comprises one of: an application, an implementation of a software service, a device, a database or a user.

3. The method of claim 1, wherein the configuration wrapper comprises a Java object with associated attributes and operations.

4. The method of claim 3, wherein the Java object is an MBean.

5. The method of claim 1, wherein the configuration wrapper is implemented using a plurality of Java objects.

6. The method of claim 1, wherein generating computer-readable metadata further comprises generating a CSV or XML file associated with the configuration data.

7. The method of claim 1, further comprising viewing properties of the resource by calling methods associated with the configuration wrapper.

8. The method of claim 7, wherein the methods of the configuration wrapper retrieve data from the configuration file.

9. The method of claim 1, further comprising modifying properties of the resource by calling methods associated with the configuration wrapper.

10. The method of claim 8, wherein the methods of the configuration wrapper modify data within the configuration file.

11. The method of claim 1, wherein at any time after the step of automatically processing the metadata the method further comprises the steps of:
   loading, with the computer system, a management agent for managing one or more resources;
   implementing, with the computer system, the configuration wrapper;
   associating, with the computer system, the configuration wrapper with the management agent; and
   using, with the computer system, the management agent to view and/or modify the properties of the resource.

12. The method of claim 11, wherein the management agent comprises a JMX management application.

13. The method of claim 1, further comprising:
   altering, with the computer system, the form of the configuration file;
   updating, with the computer system, the metadata associated with the configuration data; and
   automatically processing the metadata, with the computer system, a further time to produce an updated configuration wrapper for the resource.

14. A system for generating a configuration wrapper for use in managing a resource, the resource having a configuration file, the system comprising:
   memory;
   an input module adapted to receive a reference to a metadata file related to the configuration file;
   a mapping module adapted to store the reference in the memory;
   a metadata module adapted to generate one or more metadata objects in the memory based on data within the metadata file;
   a builder module adapted to generate one or more configuration wrapper objects in the memory based on the metadata objects; and
   a writer module adapted to write one or more implementation files based on the one or more configuration wrapper objects generated by the builder module, wherein the one or more implementation files are used to implement a configuration wrapper for the resource; and
   at least one processor operatively coupled to the memory, the input module, the mapping module, the metadata module, the builder module, and the writer module.

15. The system of claim 14, wherein the builder module and the writer module are adapted to produce configuration wrapper objects and implementation files in one or more of the following formats: Java, C++ and XML Schema (XSD).

16. The system of claim 15, further comprising one or more additional builder and writer modules, wherein the system is adapted to output implementation files for two or more formats.

17. The system of claim 14, wherein the input module is adapted to receive a mapping file comprising one or more mappings between one or more configuration files and one or more respective metadata files.

18. The system of claim 17, wherein the input module is adapted to receive a mapping file comprising a plurality of mappings and the system is further adapted to generate implementation files for a plurality of configuration wrappers.

19. The system of claim 18, wherein the system is adapted to generate implementation files for a plurality of configuration wrappers for managing a plurality of resources.

20. A non-transitory computer-readable medium comprising processor readable instructions configured cause one or more processors to process metadata associated with configuration data for a resource within a computer system to generate a configuration wrapper for use in managing the resource, the processor readable instructions cause the one or more processors to:

receive a computer-readable configuration file that configures a resource based on at least one configurable parameter, the computer-readable configuration file comprising configuration data for the resource at a computer system, the configuration data including one or more configurable parameters related to the resource;

generate, with the computer system, computer-readable metadata related to the configuration data and storing in a computer-readable metadata file;

generate, with the computer system, a configuration wrapper by automatically processing the computer-readable metadata to manage the computer-readable configuration file, wherein automatically processing the metadata comprises:
providing, with the computer system, a reference to the metadata file,
processing, with the computer system, the metadata file using an automator application, and
generating, with the computer system, one or more files that are used to implement the configuration wrapper; and store the configuration wrapper in a computer-readable medium.

21. A system for generating a configuration wrapper for use in managing a resource, the system comprising:

one or more processors; and
one or more memories coupled with the one or more processors, wherein the one or more processors and one or more memories are configured to:

receive a computer-readable configuration file that configures a resource based on at least one configurable parameter, the computer-readable configuration file comprising configuration data for the resource at a computer system, the configuration data including one or more configurable parameters related to the resource;

generate, with the computer system, computer-readable metadata related to the configuration data and storing in a computer-readable metadata file;

generate, with the computer system, the configuration wrapper by automatically processing the computer-readable metadata to manage the computer-readable configuration file, wherein automatically processing the metadata comprises:
providing, with the computer system, a reference to the metadata file,
processing, with the computer system, the metadata file using an automator application, and
generating, with the computer system, one or more files that are used to implement the configuration wrapper; and store the configuration wrapper in a computer-readable medium.

* * * * *